Patented Mar. 4, 1947

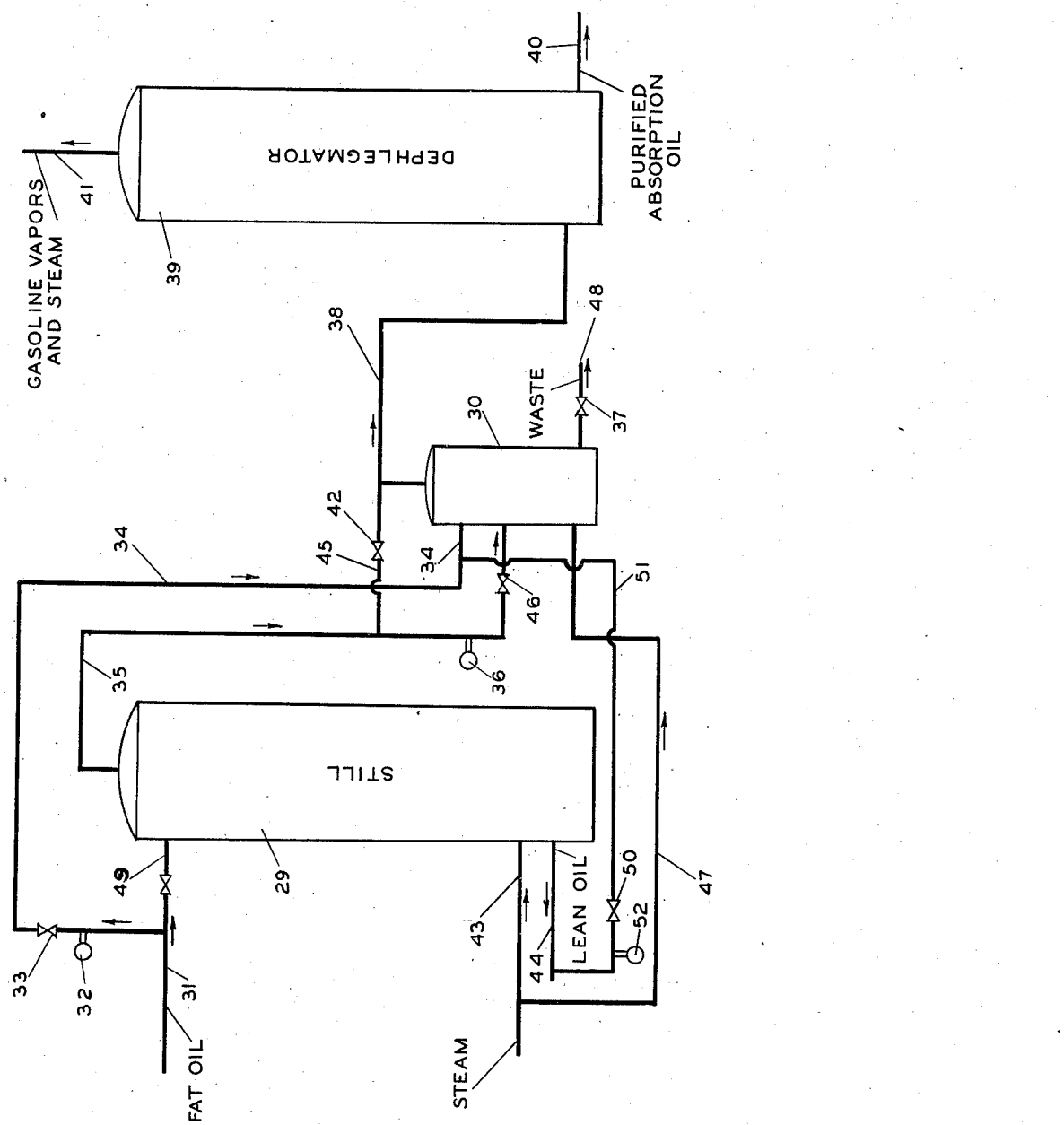

2,417,007

UNITED STATES PATENT OFFICE 2,417,007

ABSORPTION OIL RECLAIMER

Charles O. Meyers, Bartlesville, Okla., assignor to Phillips Petroleum Company, a corporation of Delaware Application June 16, 1944, Serial No. 540,643

2 Claims. (Cl. 196—8)

This invention relates to a process for the purification of absorption oils and more particularly it relates to a method for the purification of absorption oils by the continuous distillation of a small fraction of the impure oil during the enriched absorption oil stripping operation.

This application is a continuation-in-part of my copending application, Serial Number 483,426, filed April 17, 1943, and now issued as U. S. Patent No. 2,353,176.

In conventional natural gasoline absorption systems, the solvent commonly used is a petroleum oil having an initial boiling point of about 350° F. and a final boiling point of about 450° F. In low pressure gasoline absorption plants about 30 to 40 gallons of absorption oil are circulated per 1000 cubic feet of gas treated, and it is not unusual for the entire charge of absorption oil in the operating cycle to be recirculated as many as one hundred times per day. By this cyclic movement of the oil, which includes its repeated contact with gas containing at times dust, hydrogen sulfide, crude oil spray, carbon dioxide, air etc., and in the stripping still with steam containing air and frequently entrained inorganic matter, the oil becomes contaminated. The presence of some or all of the materials mentioned, together with the frequent heating and cooling causes chemical changes in the oil itself. These impurities lead to the formation within the oil of high boiling bodies, the result of oxidation and other reactions as well as the accumulation of extraneous impurities.

Probably the most harmful of such accumulations are the chemical products of the oil itself. These materials are soluble in the oil up to a certain point and when this point or saturation is reached, such materials having the nature of varnish or tar, are deposited in such parts of the system as heat exchangers and coolers. By forming a film on these cooling or heating surfaces, the heat exchange efficiency is materially lowered.

Attempts have been made to purify absorption oils by such processes as sedimentation in a surge tank, or treatment by centrifuge. Later distillation by fire and steam or other stripping gas was used, and in principle the distillation was a marked improvement over the earlier mechanical methods.

One of the earlier distillation methods was to distill the entire body of contaminated oil at intervals. This method was efficient, that is, the oil was well purified since it was an overhead condensate, but was uneconomical since the absorption plant must be closed down for this distillation step. The art was materially advanced when a process was introduced for bypassing a small portion of the lean absorption oil stream to a separate and distinct distillation unit in which the relatively small amount of impure absorption oil was continuously distilled as an overhead product. In this process a heater was required to raise the absorption oil to the distillation temperature. Distilled vapors with or without steam passed overhead to condensing coils and the condensate therefrom passed to a separator in which water was separated from the purified oil. The latter was then added to the main portion of the absorption oil.

Another process in the advancement of the art consisted in continuously diverting a small proportion of a contaminated absorption oil, either rich or lean, from the main stream and subjecting this diverted portion to direct contact with the same heating medium used in the stripping still. The quantity of heating medium required was only that necessary to vaporize the absorbent from the residual foreign matter. The absorbent vapors and heating medium were then conducted into the main stripping still in which the said vaporous absorbent and heating medium expended their heat content in stripping the absorbed constituents from the main body of rich absorption oil, and by this procedure the small portion of purified absorption oil was returned to the absorption oil without loss of heat. By this process, the small quantity of oil being distilled was heated to a relatively high temperature, and frequently because of the relatively high distillation temperature, chemical reaction occurring in the oil being distilled, especially toward the end of the distillation, necessitated withdrawal of relatively large amounts of bottoms, making the overall absorption oil loss abnormally large.

In the above identified parent patent application a definite advance in the art of absorption oil purification was described. In that application I disclosed a process for purifying absorption oils by distillation of a small fraction of the oil at a relatively low temperature, thereby overcoming the above-mentioned objection. To carry out my process I removed a small portion of the enriched or fat absorption oil from the main stream. The latter was then passed into the stripping still on the top tray or it could be added to the still several trays below the top. When I added the main body of fat oil to the stripper several trays below the top tray, I then added the small separated portion of the fat oil to the same stripping column on the top tray. By this procedure the main portion of absorbed natural gasoline which was freed from the absorbent by the stripping operation passed through the very small portion of absorption oil in the top several trays. In other words, the very large volume of still vapors and steam greatly reduced the partial pressure of the much smaller volume of oil vapor, thus reducing the partial vapor pressure of the liquid. In an attempt to establish equilibrium, vaporization from the said upper trays took place until the partial pressure of the vapor and the partial vapor pressure of the liquid were equalized. Hence the desirable light end portion of the absorption oil was vaporized and carried with the main stripping still vapors overhead and thence to the dephlegmator. In this dephlegmator the distilled absorption oil was condensed and separated from the gasoline vapors. The purified condensed oil was then removed from the dephlegmator as bottoms and returned to the main absorption oil stream while the uncondensed overhead vapors passed to a conventional gasoline condensing and separating apparatus. The residual oil from the purification step was drained from the bottom purifying plate to an accumulator from which it was intermittently or continuously removed, as desired.

In a second embodiment of the aforesaid copending application, the main body of rich absorption oil was passed into the top tray of the stripping still, and the small bypass volume of rich oil passed into the top of a small auxiliary stripping or distillation vessel. Into the bottom of this auxiliary vessel was passed the main stream of stripped vapors and steam from the primary stripping tower. This large volume of hydrocarbon vapors or gases and steam contacted countercurrently the downflowing rich oil and removed therefrom not only the absorbed hydrocarbons but the major portion of the absorption oil itself. Only the highest boiling, least volatile portion of the absorption oil was not distilled by such an operation.

I have now discovered a method of operation of such an absorption oil purification process whereby material savings in steam consumption are realized and at the same time a still greater recovery of purified absorption oil is accomplished.

An object of this invention is to provide a continuous absorption oil purification process which is simple and economical in operation.

Still another object of this invention is to provide a continuous process whereby an absorption oil may be purified and maintained in a purified condition by distillation with the consumption of a minimum amount of steam.

Yet another object of my invention is to provide a continuous absorption oil purification process whereby absorption oil losses are reduced to a minimum.

Still other objects and advantages of my invention will be evident to those skilled in the art from a careful study of the following disclosure in which The figure is a diagrammatic representation of one form of apparatus in which my invention may be practiced.

Referring now to the figure, numeral 29 refers to a conventional stripper or stripping tower. This vessel may be a bubble cap tower, or may be equipped with any suitable form of packing or contact apparatus, such as to promote intimate contact between countercurrently flowing fluids, for example, liquid flowing downward and vapor passing upward. Line 31 leads rich absorption oil into the stripping tower 29, while line 44 conducts the stripped or lean absorption oil from the stripper. Stripping steam enters through the steam line 43, while the stripping steam and stripped vapors leave the vessel by way of a vapor line 35 and are conducted thereby into the midportion of an auxiliary purifier apparatus or tower 30. The flow of this vapor stream may be metered, if desired, by a meter 36. A line 34 connects the main rich oil inlet line 31 and purifier 30 and is equipped with a flow meter 32 and a flow control valve 33. A line 48 conducts waste or residue from the purifier to storage or other disposal, as desired.

The purifier 30 is preferably a bubble cap tower similar in construction to still 29 but is much smaller in size and carries only a few bubble cap plates. A line 38 connects the top of this purifier 30 with the lower section of a dephlegmator 39, which dephlegmator serves for condensation and separation of the distilled absorption oil carried in the hydrocarbon vapors from the purifier 30. The dephlegmator bottoms are the distilled and purified portion of the absorption oil and may be withdrawn through a line 40 and added to the main portion of the lean absorption oil whereby the absorption oil is maintained in a remarkably pure condition. A line 41 carries overhead vapors from the dephlegmator to condensers, separators and fractionators, not shown. A line 45 serves as a bypass line from line 35 to line 38, in case the entire stream of hydrocarbon vapors from line 35 is not needed for distillation in the purifier 30. The flow of the vapors through this bypass line may be regulated or controlled by manipulation of valves 46 and 42, which controls may be manual or automatic as desired. A line 47 connects the steam line 43 with the bottom of the purifier 30.

In the operation of my process when using apparatus as shown in the figure, rich absorption oil from an absorber, not shown, enters the system by way of line 31, and the major portion of this oil, say as much as 99% or even more, passes directly into the top of the stripper still 29 through a feed line 49.

The remaining very small portion of the rich absorption oil stream is bypassed from line 31 through line 34 and enters the top of the purifier 30. The rate of flow of this rich oil may be measured by a flow meter 32 and controlled by a valve 33, which latter may be manually or automatically operated, as desired. Stripping agent, such as steam, enters the stripper through line 43 and passes upward through said stripper. In so doing, the absorbed gasoline hydrocarbons are distilled or stripped from the down flowing absorption oil, thus a mixture of stripped gasoline hydrocarbon vapors and steam leaves the stripping still 29 and passes by way of line 35 into the midsection of the purified still 30. The main function of stripping still 29 is to permit removal of the dissolved gasoline from the absorbent, and it is intended to add sufficient steam to this stripper from line 43 so that lean absorption oil issuing from the stripper through line 44 is essentially free of dissolved or absorbed hydrocarbons. When adding this amount of steam to the stripper, upon reaching the top stripper tray, the upward passing vapors comprising gasoline vapors and steam are not in equilibrium with respect to the absorption oil, that is, the partial pressure of the absorption oil in the vapors over this top stripper tray is less than the partial vapor pressure of the absorption oil under the top tray conditions of temperature and pressure. Since the partial pressure of the absorption oil is not as great as its possible equilibrium value under the conditions exisiting in the top of the stripper vapors then on passing through the very small amount of rich absorbent in the purifier 30 vaporize more absorption oil and the vapors then issuing from the top of the purifier 30 through line 38 contain a larger portion of absorption oil in the vapor form than do the vapors in the top tray of the stripper 29. This increase in the amount of vaporous absorption oil is then the amount of liquid absorption oil distilled in the purifier tower 30.

I have found in the operation of a plant using this process that about 97% of the absorption oil entering purifier 30 is distilled. I have also found that by adding a small amount of steam into the bottom of the purifier that a still greater percentage of absorption oil can be distilled. Thus, by the addition of this steam the amount of absorption oil undistilled and withdrawn through valve 37 as reject material is appreciably reduced. In this operation I have also found that the amount of steam used in the original stripping in still 29 may be materially reduced and this saving in steam considerably more than offsets the amount of steam consumed in the purifier 30. The net result is a saving in steam consumption and at the same time less absorption oil is lost as waste material.

In the normal operation hydrocarbon vapors and steam from still 29 pass upward in the upper portion of purifier 30 and distill a portion of the absorption oil. The higher boiling ends of the absorption oil which are not distilled in the upper portion of purifier 30 are then subjected to the action of the live steam coming from the steam line 47. In this manner live steam is used only to distill a very, very small amount of the highest boiling materials of the absorption oil.

The overhead vapors from the purifier 30 pass therefrom through line 38 into the base of the dephlegmator 39. In this vessel the heat balance is so adjusted as to cause condensation of only the absorption oil vapors. The gasoline vapors and steam pass from the dephlegmator 39 by way of line 41 to condensers, separators, gasoline fractionators, or stabilizers, etc., all of which apparatus is conventional and therefore not shown. The dephlegmator or condensate bottoms comprise distilled and purified absorption oil and this is withdrawn through line 40 and is returned to the main lean oil stream previous to heat exchange and cooling.

The dephlegmator 39 is essentially a bubble cap column or other column suitable for the purpose of separating the absorption oil from the vapor stream. The heavy undistilled ends of the absorption oil removed from the bottom of the purifier contain heavy polymers, tarry-like materials and other components which detract from the efficiency of absorption oils, as well as mechanical rust, scale, etc. This waste liquid material may have its content of solids removed by settling or filtration or other means and may be used as boiler fuel or otherwise disposed of.

In the operation of an absorption oil purifier according to older methods whereby the small amount of steam is not added to the purifier by way of line 47 an excess of steam may be added to the main stripper still, over that required to obtain equilibrium on the top stripper tray with respect to the fat absorption oil. In the operation according to my present invention this excess of steam need not be added and this saving is an important advantage. This saving in steam consequently more than offsets the amount of steam used in the small purifier still 30, and this saving constitutes one of the important advantages of my process.

In one specific example of the utility of my process, the steam rate to the main stripper still 29 was 10,000 pounds per hour for stripping 30,000 cubic feet of hydrocarbon vapor from the rich oil. This combined steam and hydrocarbon vapor stream then was passed into the purifier tower into which 150 gallons rich absorption oil per hour flowed. 97% of this rich oil feed was distilled by the combined hydrocarbon vapor and steam. The undistilled portion constituted the very high boiling ends of the absorbent and the usable portion of this material was distilled by the use of only 300 pounds of steam per hour. By this last operation 80% of the absorption oil previously lost was saved as overhead distillate making an overall recovery of 97+.80×3 or 99.4%. Thus 99.4% of the absorption oil passed to the purifier tower was returned to the lean absorbent. The 150 gallons fat oil per hour represented 0.5% of the fat oil stream passing to the stripper column.

Applicant does not wish to be limited by any explanation or theory of the above operation, but only by the appended claims.

The towers, strippers, purifier and dephlegmator shown and described herein, have been described as bubble cap towers for convenience, but applicant does not wish to be restricted to the use of this type of equipment, since other types of contactor packing may be used satisfactorily, providing contact between the countercurrently flowing materials is efficient. The meters, valves, pumps, etc., may be standard equipment, and may be inserted at many points in the apparatus to assist in the efficient control and operation of the process.

While I have described one embodiment of my invention as represented diagrammatically by the figure, I do not wish to limit my invention thereby, since many variations and modifications may be made and yet remain within the intended scope and spirit of my invention.

For example valve 50 can be opened (it has been considered as closed throughout the above specification) and valve 33 can be closed. Then lean oil from 44 will pass through pipe 51 into pipe 34 and into purifier 30 in the same manner as the fat oil from 31 as described above. A flow meter 52 is provided for use as flow meter 32 was used. The lean oil is hotter than the fat oil and does not contain absorbed hydrocarbons so the amount of heat applied to purifier 30 is less in this case.

The invention therefore is defined only in the following claims.

I claim:

1. An absorption oil purification process for removing accumulated high boiling impurities from used absorption oils and requiring only a minimum amount of steam comprising passing an amount of absorption oil previously enriched with absorbed gasoline hydrocarbon and to be purified into the inlet end of a contact zone having an inlet end and an outlet end with respect to the flow of liquid absorption oil being purified, introducing a stream of gasoline hydrocarbon vapors previously removed from another portion of said rich absorption oil and steam into the contact zone at a point intermediate the ends thereof, introducing steam into the contact zone at the outlet end, withdrawing a combined stream of steam, gasoline hydrocarbon vapors and distilled absorption oil at the inlet end of said contact zone, passing said combined stream into a dephlegmator condensing in said dephlegmator the distilled absorption oil portion of said combined stream and withdrawing the uncondensed gasoline hydrocarbon vapors and steam, and withdrawing said condensed absorption oil as the purified product of the process; and withdrawing undistilled bottoms from said contact zone as reject material.

2. An absorption oil purification process for removing accumulated high boiling impurities from used absorption oils and requiring only a minimum amount of steam comprising passing a small fraction of a main stream of absorption oil previously enriched with absorbed gasoline hydrocarbon into the inlet end of a contact zone having an inlet end and an outlet end with respect to the flow of liquid absorption oil being purified, introducing a stream of gasoline hydrocarbon vapors previously removed from another portion of said rich absorption oil and steam into the contact zone at a point intermediate the ends thereof, introducing steam into the contact zone at the outlet end, withdrawing a combined stream of steam, gasoline hydrocarbon vapors and distilled absorption oil at the inlet end of said contact zone, passing said combined stream into a dephlegmator, condensing in said dephlegmator the distilled absorption oil fraction of said combined stream and withdrawing the uncondensed gasoline hydrocarbon vapors and steam, and withdrawing said condensed absorption oil as the purified product of the process; and withdrawing undistilled bottoms of absorption oil from said contact zone as reject material, and combining this purified oil with a main body of lean absorption oil whereby the entire body of absorption oil is maintained in a relatively purified condition.

CHARLES O. MEYERS.

REFERENCES CITED

The following references are of record in the file of this patent:

UNITED STATES PATENTS

| Number | Name | Date |
|---|---|---|
| 1,713,323 | Bernard | May 14, 1929 |
| 2,196,878 | Stover | Apr. 9, 1940 |
| 2,353,176 | Meyers | July 11, 1944 |
| 1,898,579 | Gard | Feb. 21, 1933 |
| 2,336,097 | Hutchinson | Dec. 7, 1943 |
| 2,164,593 | Rector | July 4, 1939 |